United States Patent
Bate et al.

(10) Patent No.: US 10,498,536 B2
(45) Date of Patent: Dec. 3, 2019

(54) SYSTEM FOR PERMITTING ACCESS TO SCOPED APPLICATIONS

(71) Applicant: ServiceNow, Inc., Santa Clara, CA (US)

(72) Inventors: Clifton Santford Bate, San Diego, CA (US); Christopher J. Nanda, Pleasant Prarie, WI (US); Gregory A. Krasnow, Encinitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 134 days.

(21) Appl. No.: 15/492,263

(22) Filed: Apr. 20, 2017

(65) Prior Publication Data

US 2018/0309583 A1 Oct. 25, 2018

(51) Int. Cl.
*H04L 29/00* (2006.01)
*H04L 9/32* (2006.01)
*G06F 21/54* (2013.01)
*G06F 21/57* (2013.01)

(52) U.S. Cl.
CPC ............ *H04L 9/3247* (2013.01); *G06F 21/54* (2013.01); *G06F 21/57* (2013.01); *G06F 2221/033* (2013.01); *H04L 9/3268* (2013.01)

(58) Field of Classification Search
CPC ... H04L 63/0823; H04L 9/3247; H04L 63/08; H04L 63/04; H04L 2209/56
See application file for complete search history.

(56) References Cited

U.S. PATENT DOCUMENTS

| | | | | |
|---|---|---|---|---|
| 2013/0091353 | A1* | 4/2013 | Zhang | H04L 9/3268 713/156 |
| 2016/0048688 | A1* | 2/2016 | Flynn | G06F 21/6281 713/193 |
| 2016/0234688 | A1* | 8/2016 | Masuyama | H04W 12/06 |
| 2016/0309331 | A1* | 10/2016 | Moon | H04W 4/70 |

OTHER PUBLICATIONS

Menezes, A., et al., Handbook of Applied Cryptography, CRC Press 1996, Chapter 11, Digital Signatures, http://cacr.uwaterloo.ca/hac/about/chap11.pdf, Downloaded Feb. 17, 2017, 65 pp.

* cited by examiner

*Primary Examiner* — Ghazal B Shehni
(74) *Attorney, Agent, or Firm* — Fletcher Yoder PC

(57) ABSTRACT

A public key embedded in a scoped application can be used to permit a trusted application to access a scoped application. The scoped application can receive a request for access to an interface of the scoped application from the trusted application. The request can include a signed identifier that is signed using a private key corresponding to the public key. The signed identifier can be authenticated using the public key. The scoped application can also verify that the signed identifier matches an identifier of the trusted application. Responsive to the authentication and verification, the trusted application may be permitted to have access to the interface of the scoped application. The private key and the public key are generated at a customer service instance operated by a computing provider. The private key is not shared outside of the customer service instance.

20 Claims, 7 Drawing Sheets

US 10,498,536 B2

SYSTEM FOR PERMITTING ACCESS TO SCOPED APPLICATIONS

BACKGROUND

An electronic computing and communications system can process information using software executing on servers at a datacenter. The software can include a scope that determines how the software can be used by other components of the electronic computing and communications system. For example, the scope can allow or deny requests to access data used by the software. The scope can also isolate the software from runtime issues caused by executing other software on the servers.

SUMMARY

Disclosed herein are implementations of systems and techniques for permitting access to scoped applications.

In an implementation, a system is provided for permitting access to a scoped application by a trusted application using a public key embedded in the scoped application. The system comprises a memory and a processor. The memory includes instructions executable by the processor to receive, by the scoped application, a request for access to an interface of the scoped application from the trusted application. The request includes a signed identifier that is signed using a private key corresponding to the public key. The memory further includes instructions executable by the processor to authenticate the signed identifier using the public key. The memory further includes instructions executable by the processor to verify, by the scoped application, that the signed identifier matches an identifier of the trusted application. The memory further includes instructions executable by the processor to permit the trusted application to have access to the interface of the scoped application responsive to the authentication of the signed identifier and the verification that the signed identifier matches the identifier of the trusted application.

In an implementation, a method is provided for permitting access to a scoped application by a trusted application using a public key embedded in the scoped application. The method comprises receiving, by the scoped application, a request for access to an interface of the scoped application from the trusted application. The request includes a signed identifier that is signed using a private key corresponding to the public key. The method further comprises authenticating the signed identifier using the public key. The method further comprises verifying, by the scoped application, that the signed identifier matches an identifier of the trusted application. The method further comprises permitting the trusted application to have access to the interface of the scoped application responsive to authenticating the signed identifier and verifying that the signed identifier matches the identifier of the trusted application.

In an implementation, a non-transitory computer-readable storage medium is provided comprising processor-executable routines that, when executed by a processor, facilitate a performance of operations. The operations comprise deploying a scoped application including a public key to a production instance. The operations further comprise deploying a trusted application including a signed identifier to the production instance, wherein a certificate associated with the signed identifier is signed using a private key corresponding to the public key. The public key authenticates the certificate to permit the trusted application to have access to an interface of the scoped application.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
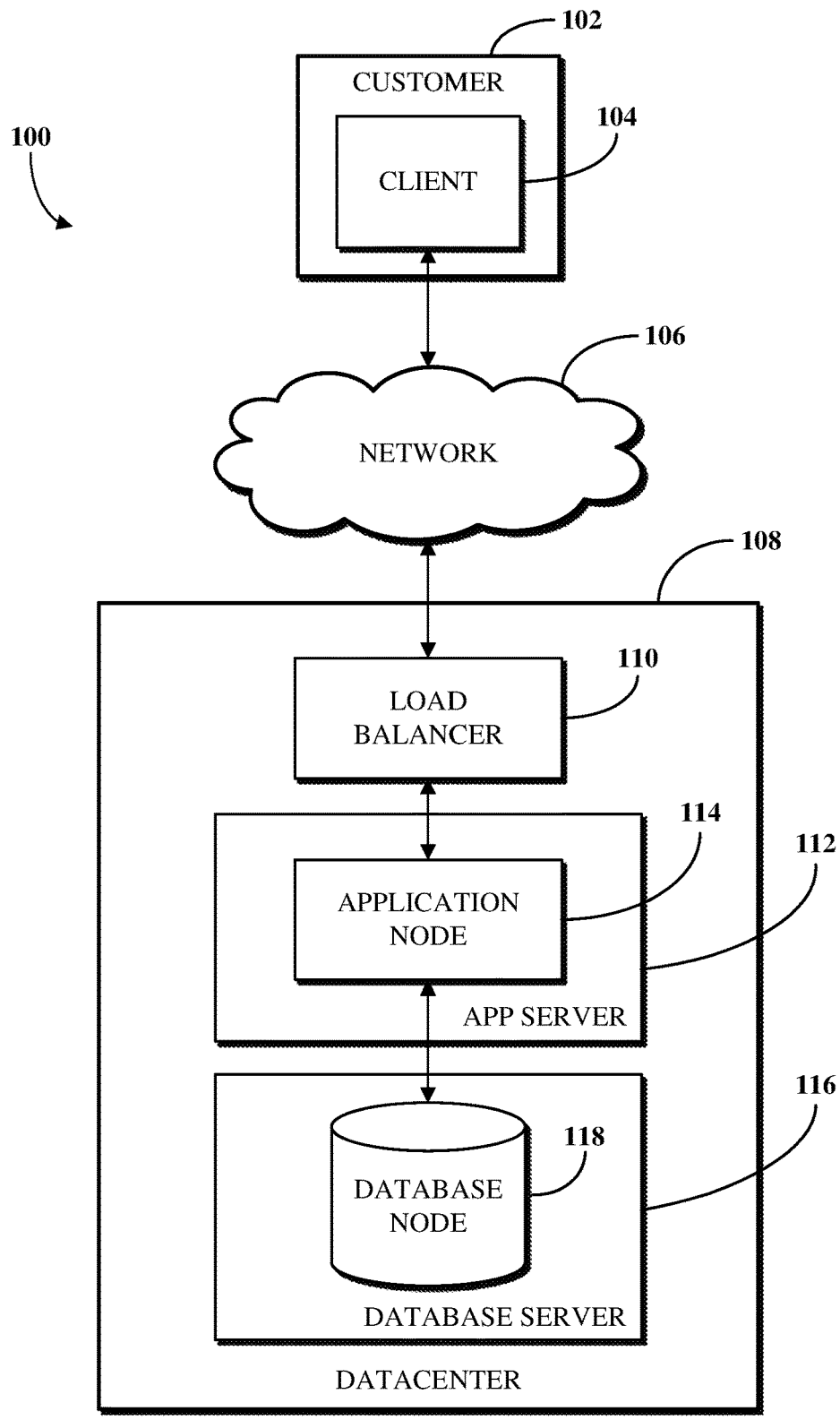
FIG. 1 is a block diagram of an example of an electronic computing and communications system.

Customers of a computing (e.g., Platform-as-a-Service (PaaS)) provider can use or develop applications that operate on or using configurable platform software. An instance of the platform software can be implemented using one or more application nodes and database nodes, such as described later with respect to FIG. 1. For example, an instance of the platform software can include functionality permitting a customer of a computing provider to develop scoped applications. Such applications may also be deployable to other instances of the platform software.

A scoped application is an application having an application scope that defines functionality of the scoped application and indicates resources of the scoped application that may be accessed by other applications. For example, a scoped application by default can access its own application data, such as may be stored in database tables associated with the scoped application. Such database tables may also be used to store application data that make up or define the scoped application (e.g., including scripts that can be used to program the behavior of the scoped application). The scoped application by default may be able to use an application programming interface (API) of the scoped application, such as to execute functions against its application data. However, other scoped applications deployed to the same instance may not by default have access to the application data or API of the scoped application.

In some cases, the functionality of one scoped application may require access to the application data and/or API of another scoped application. One way to permit access by a first scoped application to the API of a second scoped application is to use a permission attribute on portions of the API that should be made accessible to the first scoped application. For example, certain parts of the API that should be accessible to the first scoped application can be marked as "public," and other parts of the API that should not be accessible to the first scoped application can be marked as "private." However, such an approach may provide access to the relevant "public" functions and application data to all scoped applications.

It may be desirable to use a granular control mechanism for access to the application data or API of a scoped application. For example, a scoped application may be a member of a suite of scoped applications that should have access to certain application data or APIs to which scoped applications outside of the suite should not have access. A scoped application that is permitted to access application data or other resources of another scoped application can be referred to as a trusted application. During development of a scoped application, a developer of the scoped application can configure access permissions of the scoped application to permit trusted applications to have access to some or all of the resources of the scoped application.

Implementations of this disclosure address problems such as those described above by using a public key embedded in a scoped application to permit a trusted application to have access to the scoped application. The scoped application receives a request for access to an interface of the scoped application from the trusted application. The request includes a signed identifier that is signed using a private key corresponding to the public key. The private key is generated at a customer service instance operated by a computing provider. The private key is not shared outside of the customer service instance. The signed identifier is authenticated using the public key. The scoped application verifies that the signed identifier matches an identifier of the trusted application. Responsive to the authentication and verification, the trusted application is permitted to have access to the interface of the scoped application. The trusted application may thus access application data of the scoped application and/or execute functions associated with an API of the scoped application.

Using the implementations of this disclosure, a scoped application does not need to have information indicating the trusted applications that are permitted to have access to it at a given time. Instead, the public key embedded in the scoped application can authenticate identifiers of other applications that are signed using a private key corresponding to that public key. As such, trusted applications having identifiers signed using such a private key can be deployed for execution even after the scoped application is deployed for execution. The implementations of this disclosure may also permit the scoped application to later be updated, such as to remove the public key therefrom to revoke access to the resources of the scoped application, or to blacklist other applications from having access even if they include an appropriate signed identifier.

Implementations of this disclosure provide technological improvements particular to computer networks, for example, those concerning the controlled access of application data and APIs within a protected computing environment. Computer network-specific technological problems such as those can be wholly or partially solved by implementations of this disclosure. For example, a public key is embedded in a scoped application deployed to a production instance. A private key corresponding to the public key can be securely maintained at a customer service instance operated by a computing provider and used to sign an identifier of a trusted application. When the scoped application receives a request for access to resources thereof from a trusted application, the signed identifier of the trusted application is authenticated using the public key. Implementations of this disclosure can thus introduce new and efficient improvements in the ways in which scoped applications are developed and deployed, such as by obviating removal of a scoped application from a production instance to permit a trusted application to access resources of the scoped application.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as a database node 118 executing on the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as the database node 118, which can be accessible by software executed on the application node 114. A database implemented by the database node 118 may be a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database and a CMDB. While limited examples are described, a database implemented using the database node 118 can be configured as or comprise any suitable database type. Further, the system 100 can include one, two, three, or any suitable number of databases configured as or comprising any suitable database type or combination thereof.

In some implementations, a database implemented using the database node 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., implemented using the database node 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more database nodes 118. For example, the one or more application nodes 114 can implement a version of the platform software, and databases implemented by the one or more database nodes 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node 118, such as wherein the database node 118 includes separate catalogs or other structure for separating the data used by platform software of a first customer and platform software of a second customer.

Some or all of the systems and techniques described herein can operate or be executed on or by the servers associated with the system 100. For example, an instance of software implemented by the application node 114 and the database node 118 can execute a scoped application that receives a request from a trusted application for access to an interface of the scoped application. In another example, an instance of software implemented by the application node 114 and the database node 118 can execute a customer service instance at which a key pair including a private key and a public key are generated for controlling access to a scoped application. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as implemented by the database node 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
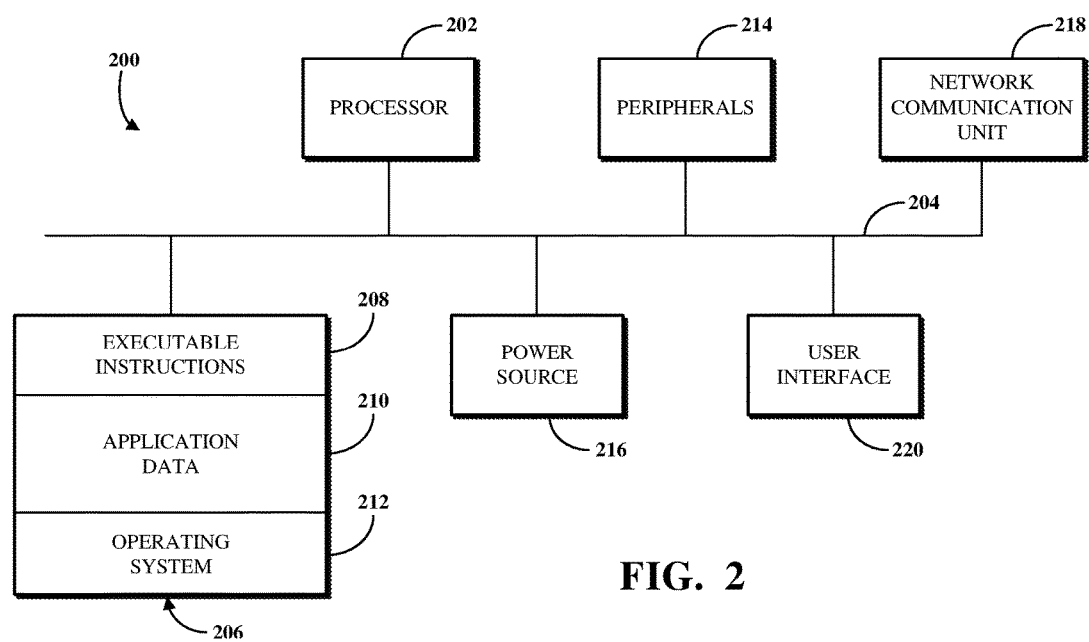
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to, responsive to a request from a trusted application received by a scoped application, authenticate a signed identifier of the trusted application using a public key embedded in the scoped application and, responsive to the authentication and a verification by the scoped application of the signed identifier of the trusted application, permit the trusted application to have access to an interface of the scoped application.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
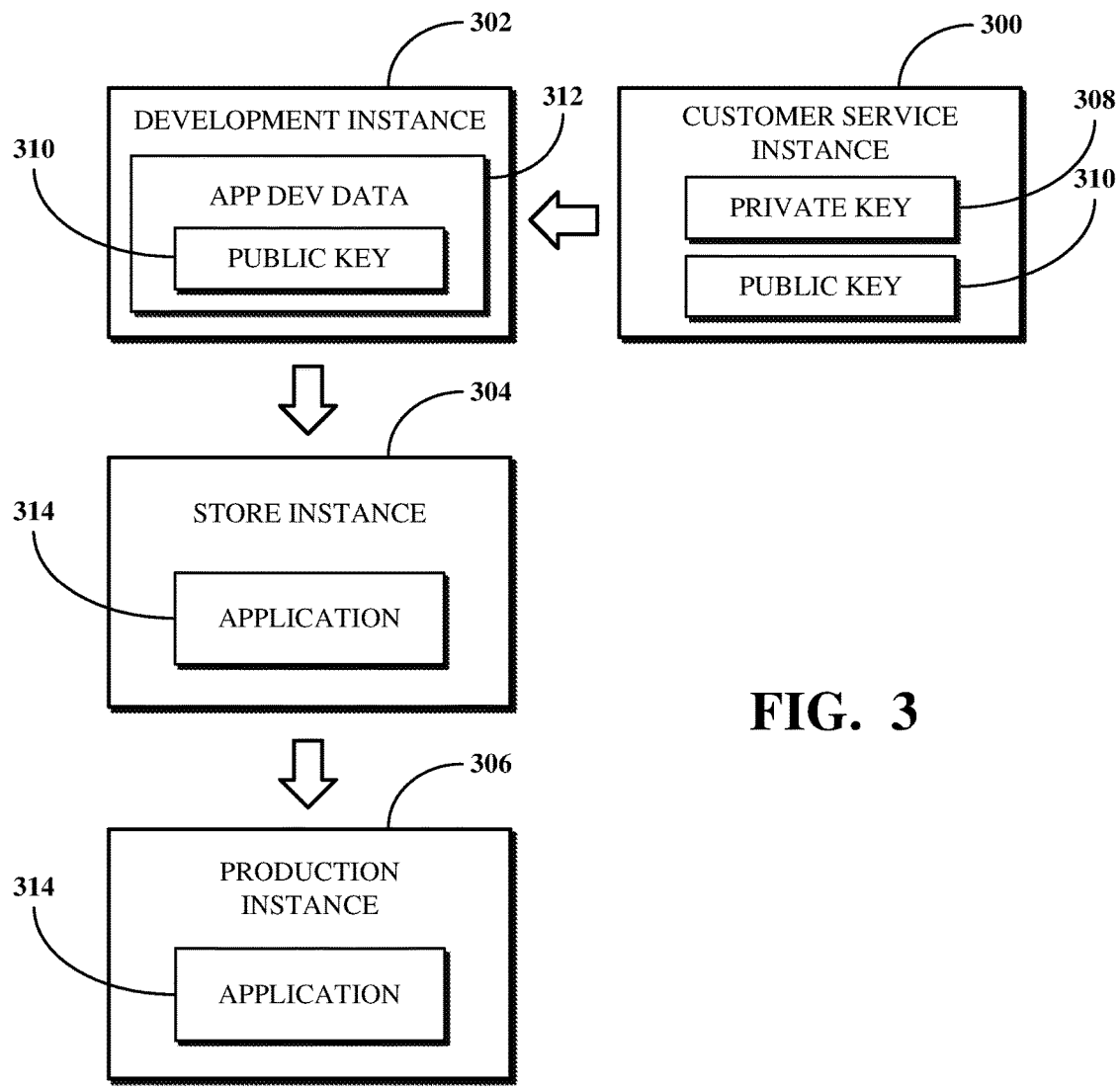
FIG. 3 is a block diagram of instances in an example of a system for permitting access to a scoped application by a trusted application.

FIG. 3 is a block diagram of instances 300, 302, 304, and 306 in an example of a system for permitting access to a scoped application by a trusted application. The example system for permitting access to a scoped application using a public key shown in FIG. 4 includes a customer service instance 300, a development instance 302, a store instance 304, and a production instance 306. One or more of the customer service instance 300, the development instance 302, the store instance 304, or the production instance 306 can be implemented using one or more application nodes, such as the application node 114 shown in FIG. 1, and one or more databases, such as may be implemented using the database node 118 shown in FIG. 1.

The customer service instance 300 is an instance of software for managing functionality and/or data associated with a customer instance, such as the development instance 302 or the production instance 306. For example, the customer service instance 300 can be used to manage accounts authorized for use with the development instance 302 or the production instance 306; request information or services, such as through a service catalog; other functionality; or combinations thereof.

The development instance 302 is an instance of software used or otherwise configured or developed within a non-production environment by a customer of a computing provider. As such, the development instance 302 can refer to a customer instance operating within an environment used by a customer to develop or test applications of the customer instance. For example, the development instance 302 may be a development version of an instance of configurable platform software, an instance of platform software designated or configured for development activities, or a combination thereof. For example, the development instance 302 may be implemented using one application node and one database node (e.g., the application node 114 and the database node 118 shown in FIG. 1).

The store instance 304 is an instance of software that may be configured or developed by a computing provider and used by customers of the computing provider. The store instance 304 may include a portal at which customers may request a scoped application to be deployed within an instance of software. For example, the store instance 304 can be used to process requests from customers for deployment of scoped applications available at the store instance 304, such as to the production instance 306.

The production instance 306 is an instance of software used or otherwise configured or designated for use within a production environment by a customer of a computing provider. As such, the production instance 306 can refer to a customer instance that can be used by clients of the customer (e.g., users other than developers of scoped applications). For example, the production instance 306 may be a production version of an instance of configurable platform software, an instance of platform software designated or configured for production activities, or a combination thereof. For example, the production instance 306 may be implemented using multiple application nodes and database nodes (e.g., the application node 114 and the database node 118 shown in FIG. 1) to provide redundancy in operations should one or more nodes fail.

A scoped application can be deployed to the production instance 306 using the operations performed by and components of the instances shown in FIG. 3. The customer service instance 300 can generate a key pair including a private key 308 and a public key 310 specific to the scoped application. The private key 308 is not shared outside of the customer service instance 300. The public key 310 can be transmitted to the development instance 302. Alternatively, the private key 308 and the public key 310 may be generated and stored in the development instance 302 or at another location controlled by the owner of the development instance 302 or the provider of the customer service instance 300, the development instance 302, the store instance 304, and/or the production instance 306.

The scoped application is developed using the application development data 312. The public key 310 is embedded in the scoped application during development at the development instance 302. For example, the public key 310 may be included in the application development data 312, which may include storing the public key 310 in a database table that holds some or all of the application development data 312.

The scoped application may be published to the store instance 304 as the application 314 once development of the scoped application at the development instance 302 has finished. For example, the publishing of the application 314 to the store instance 304 may be requested by a developer of the scoped application through an interface provided by the development instance 302 or the store instance 304. The application 314 includes the public key 310, application data, and an API (e.g., where the application data and the API were developed at the development instance 302). The application 314 can be deployed to the production instance 306 from the store instance 304. For example, deployment of the application 314 to the production instance 306 can be responsive to a request for the application 314 from a user received using an interface provided by the store instance 304 or the production instance 306. The application 314 may then be copied to and/or installed at the production instance 306.

A trusted application (not shown) may also be deployed to the production instance 306. For example, application development data associated with the trusted application can be generated at a second development instance responsive to development commands received from a developer. Once development has finished at the second development instance, the trusted application can be published to the store instance 304. The published trusted application can thereafter be deployed to the production instance 306 from the store instance 304, such as responsive to a request from a user of the production instance 306. As will be described later, an identifier of the trusted application can be signed using the private key 308 and included in the trusted application to permit the trusted application to have access to the scoped application.

Other implementations of the system shown in FIG. 3 are available. In some such other implementations, additional, fewer, or different instances may be used than as shown. For example, the customer service instance 300 may be omitted or combined with the store instance 304. In another example, the development instance 302 may be omitted (e.g., where development of a scoped application is instead conducted using the production instance 306).

Figure 4:
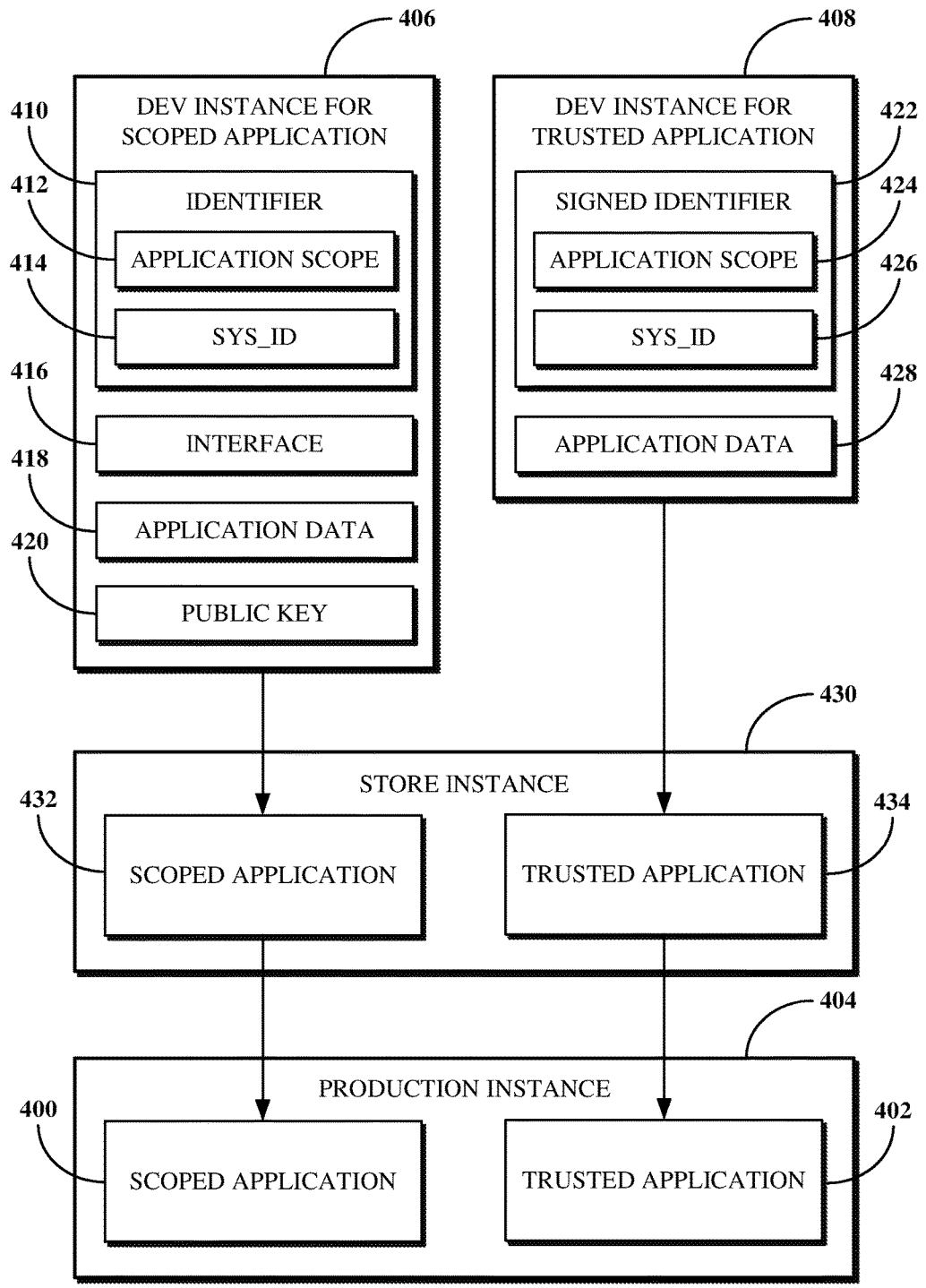
FIG. 4 is a block diagram of an example deployment of applications to a production instance.

FIG. 4 is a block diagram of an example deployment of applications 400 and 402 to a production instance 404. The production instance 404 can be the production instance 306 shown in FIG. 3. The scoped application 400 is a scoped application developed within a development instance 406. The trusted application 402 is a scoped application developed within a development instance 408. The development instances 406 and 408 are non-production instances, such as the development instance 302 shown in FIG. 3.

The development instance 406 includes components of a scoped application, such as an identifier 410, an application scope 412, a sys_id 414, an interface 416, application data 418, and a public key 420. The development instance 408 includes components of a trusted application, such as a signed identifier 422, an application scope 424, a sys_id 426, and application data 428.

An identifier, such as the identifier 410 of the scoped application or the signed identifier 422 of the trusted application, can include an application scope and a sys_id of a scoped application. For example, the identifier 410 includes the application scope 412 and the sys_id 414, and the signed identifier 422 includes the application scope 424 and the sys_id 426. An application scope, such as the application scope 412 of the scoped application or the application scope 424 of the trusted application, indicates one or more database tables, fields, script names, or the like that are available to a scoped application having that application scope.

The application scope 412 or the application scope 424 can be a namespace of the scoped application or the trusted application, respectively. For example, a namespace identifier can be added as a prefix to one or more database tables, fields, script names, or the like, such as to associate those resources with a scoped application having the same namespace identifier. The identifier used by each scoped application may correspond to a different namespace. For example, the identifier 410 may correspond to a first namespace, whereas the signed identifier 422 may correspond to a second namespace.

For example, the scoped application can be an application for reserving conference rooms in an office building. The application scope 412 can be "acme book_rooms." The term "acme" as used therein can refer to a namespace for the scoped application, a customer that developed the scoped application, or the like. The term "book_rooms" as used therein can be associated with a sys_id of the scoped application, one or more resources accessible by the scoped application, or the like. As such, one or both of the term "acme" or the term "book_rooms" as used therein can include the application scope of the scoped application. For example, where the term "acme" refers to a namespace, the application scope 412 is resources available within the "acme" namespace. In another example, resources associated with the scoped application may also be prefixed within the application scope 412 (e.g., the name of one or more database tables may begin with the application scope 412).

An application scope, such as the application scope 412 or the application scope 424, can include one or more elements indicative of the database tables, fields, script names, API calls, or other resources available to the scoped application. For example, an application scope can include an element associated with a developer of the scoped application, an element associated with an application suite that includes the scoped application, an element associated with a name of the scoped application, other elements, or a combination thereof.

Referring to the above example in which the scoped application is an application for reserving conference rooms, the application scope of the scoped application can be "acme_meeting_tools_book_rooms." The term "acme" as used therein can be an element of the application scope that is associated with a developer of the scoped application. For example, "acme" can refer to a customer of a computing provider that provides platform software for developing scoped applications. The term "meeting_tools" as used therein can be an element of the application scope that is associated with an application suite of the scoped application. For example, the scoped application can be one of a collection of scoped applications that can be used to schedule in-person meetings. The term "book_rooms" as used therein can be an element of the application scope that is associated with a name of the scoped application. For example, the scoped application can have the name "book_rooms" so that it can be identified, such as within the application suite "meeting_tools." Application families are further described below with respect to FIG. 6.

The sys_id 414 or the sys_id 426 can be a globally unique identifier (GUID). For example, the sys_id 414 or the sys_id 426 can be a hexadecimal string used to identify the scoped application or the trusted application, respectively, such as within a system in which the scoped application or the trusted application can be developed or deployed. A sys_id can be used to uniquely identify an application based on the value of the GUID. An application scope can be used to uniquely identify an application, such as based on a developer, an application name, or the like. As such, while the identifier 410 includes the application scope 412 and the sys_id 414, each of the application scope 412 and the sys_id 414 may be used independently of the other to identify the scoped application. Similarly, while the signed identifier 422 includes the application scope 424 and the sys_id 426, each of the application scope 424 and the sys_id 426 may be used independently of the other to identify the trusted application. For example, one of the application scope 412 or the sys_id 414 could be omitted from the identifier 410, and one of the application scope 424 or the sys_id 426 could be omitted from the signed identifier 422. Alternatively, one or both of the identifier 410 or the signed identifier 422 may identify elements other than (or in addition to) an application scope or sys_id.

The interface 416 can be an API or other interface for accessing functionality of the scoped application developed in the development instance 406. For example, the interface 416 can receive instructions from a trusted application to execute a function of an API of the scoped application. In another example, the interface 416 can receive instructions from a trusted application to access (e.g., read, write, or the like) the application data 418 of the scoped application. The application data 418 refers to data stored in database tables, fields, or the like, that are accessible by the scoped application by default. Similarly, the application data 428 refers to data stored in database tables, fields, or the like, that are accessible by the target application by default. Some of the application data 418 may be the same as some of the application data 428. However, the application data 418 and the application data 428 are not identical.

The scoped application developed within the development instance 406 includes a public key 420. The public key 420 may be, for example, the public key 310 shown in FIG. 3. The signed identifier 422 is signed by a private key corresponding to the public key 420 (e.g., the private key 308 shown in FIG. 3). The signing of the signed identifier 422 may take the form of a signature included with the signed identifier 422, which may be a certificate generated using a private key. The signed identifier 422, when decrypted by the associated public key 420, can be used to authenticate access to the scoped application of the development instance 406.

For example, responsive to a request by the trusted application of the development instance 408 to access the application data 418 of the scoped application via the interface 416 of the scoped application, a signature included in the signed identifier 422 can be used to authenticate the contents of the signed identifier 422 to permit the requested access. The authentication can be used to confirm that the application scope 424 and the sys_id 426 have not changed since the signature was created. A change in the application scope 424 or the sys_id 426 would cause the signature to not authenticate the contents of the signed identifier 422. The application scope 424 and the sys_id 426 can be compared against a known application scope and sys_id of the trusted application by the scoped application. For example, an instance on which the scoped application and the trusted application execute (e.g., the production instance 404 on which the scoped application 400 and the trusted application 402 execute) may include functionality for permitting the scoped application to verify the application scope and/or sys_id of an application that attempts to access the scoped application. This process may operate to prevent a signed identifier from being used to authenticate access for an application that is not trusted.

The scoped application can be deployed from the development instance 406 to a store instance 430 to produce scoped application 432. The trusted application can be deployed from the development instance 408 to the store instance 430 to produce trusted application 434. The store instance 430 can be, for example, the store instance 304 shown in FIG. 3.

The scoped application 432 can include all or some of the components included in the development instance 406, for example, the identifier 410, the application scope 412, the sys_id 414, the interface 416, the application data 418, or the public key 420. For example, the scoped application 432 can include the public key 420, such as to authenticate a signed identifier of the trusted application 434. The trusted application 434 can include all or a portion of the components included in the development instance 408, for example, the signed identifier 422, the application scope 424, the sys_id 426, or the application data 428. For example, the trusted application 434 can include the signed identifier 422, such as for authentication by a public key of the scoped application 432.

The scoped application 432 may be deployed from the store instance 430 to the production instance 404 as the scoped application 400. As such, the scoped application 400 may be the same as the scoped application 432. Similarly, the trusted application 434 may be deployed from the store instance 430 to the production instance 404 as the trusted application 402. As such, the trusted application 402 may be the same as the trusted application 434. The scoped application 400 or the trusted application 402 may include customizations or user data different from what is included in the scoped application 432 or the trusted application 434, respectively. The production instance 404 can be, for example, the production instance 306 shown in FIG. 3.

The trusted application 402 can be permitted to access an interface of the scoped application 400 when both the trusted application 402 and the scoped application 400 are deployed within the production instance 404. A certificate of the trusted application 402, generated using a private key corresponding to a public key of the scoped application 400, indicates that an identifier of the trusted application 402 is a signed identifier. The signed identifier of the trusted application 402 can be signed without removing the scoped application 400 from the production instance 404 or otherwise redeploying the scoped application 400 to the production instance 404. At the time the scoped application 400 is deployed to the production instance 404, the scoped application 400 does not need to have information indicating that the trusted application 402 is permitted to have access to the resources of the scoped application 400. As such, the signed identifier of the trusted application 402 can be signed, and the trusted application 402 deployed to the production instance 404, before, after, or simultaneously with the deployment of the scoped application 400 to the production instance 404.

The signed identifier of the trusted application 402 can be authenticated and verified, such as by the scoped application 400 or using the public key of the scoped application 400, to permit the trusted application 402 to have access to the interface of the scoped application 400. For example, the signed identifier of the trusted application 402 can become known to the production instance 404 upon the deployment of the trusted application 402 to the production instance 404. The scoped application 400 may use a trusted API of the production instance 404 to receive the signed identifier of the trusted application 402 from the production instance 404. The scoped application 400 may have its own API that authenticates and verifies the signed identifier received from the production instance 404. For example, the trusted API of the production instance 404 can include base functionality for the scoped application 400, such as to receive requests including identifiers from other applications deployed to the production instance 404. The base functionality can be expanded upon, such as by an API of the scoped application 400, to provide additional functionality, such as to authenticate and verify identifiers received from the other applications. As will be described later, trusted applications, such as the trusted application 402, can use the access to the interface of the scoped application 400 to access application data of the scoped application 400 or execute functions of an API of the scoped application 400.

The scoped application 400 and the trusted application 402 can be developed and published to the store instance 430 by a single entity, such as a computing provider, a single customer of the computing provider, a single third-party vendor, or the like. For example, a customer of a computing provider can develop multiple scoped applications designed to be used together to deliver a software service, such as an application suite (described later with respect to FIG. 6).

Alternatively, the scoped application 400 and the trusted application 402 can be developed by different entities, such as a computing provider and one or more customers of the computing provider, a plurality of different customers of the computing provider, a computing provider and one or more third-party vendors, one or more customers of the computing provider and one or more third-party vendors, or the like. For example, the scoped application 400 can be developed by a first customer or a first third-party vendor of a computing provider. The trusted application 402 can be developed by a second customer or a second third-party vendor of the computing provider. However, the trusted application 402 may still require access to application data or an API of the scoped application 400.

Implementations of the applications 400 and 402 or the deployment thereof to the production instance 404 depicted in FIG. 4 can include additional, less, or combined functionality as compared to that described above, or functionality other than that described above, or combinations thereof. In some implementations, the scoped application 400 of the production instance 404 may not be the same as the scoped application 432 of the store instance 430. Similarly, the trusted application 402 of the production instance 404 may not be the same as the trusted application 434 of the store instance 430. For example, aspects of the application data or the interface of the scoped application 432 may be different from corresponding aspects of the application data or the interface of the scoped application 400. In another example, aspects of the application data or the interface of the trusted application 434 may be different from corresponding aspects of the application data or the interface of the trusted application 402.

In some implementations, the scoped application 432 may not include the public key 420. For example, the public key 420 may be separately deployed to the store instance 430 as an added security measure for protecting the scoped application from unauthorized access. In such a case, the public key 420 can remain in the development instance 406 and be deployed, such as to the production instance 404, responsive to a request therefor.

In some implementations, an identifier of a scoped application can be a separate element from an application scope or sys_id of the scoped application. For example, the identifier 410 of the scoped application 400 may be a separate element from the application scope 412 or the sys_id 414. Similarly, the signed identifier 422 of the trusted application 402 may be a separate element from the application scope 424 or the sys_id 426.

Figure 5:
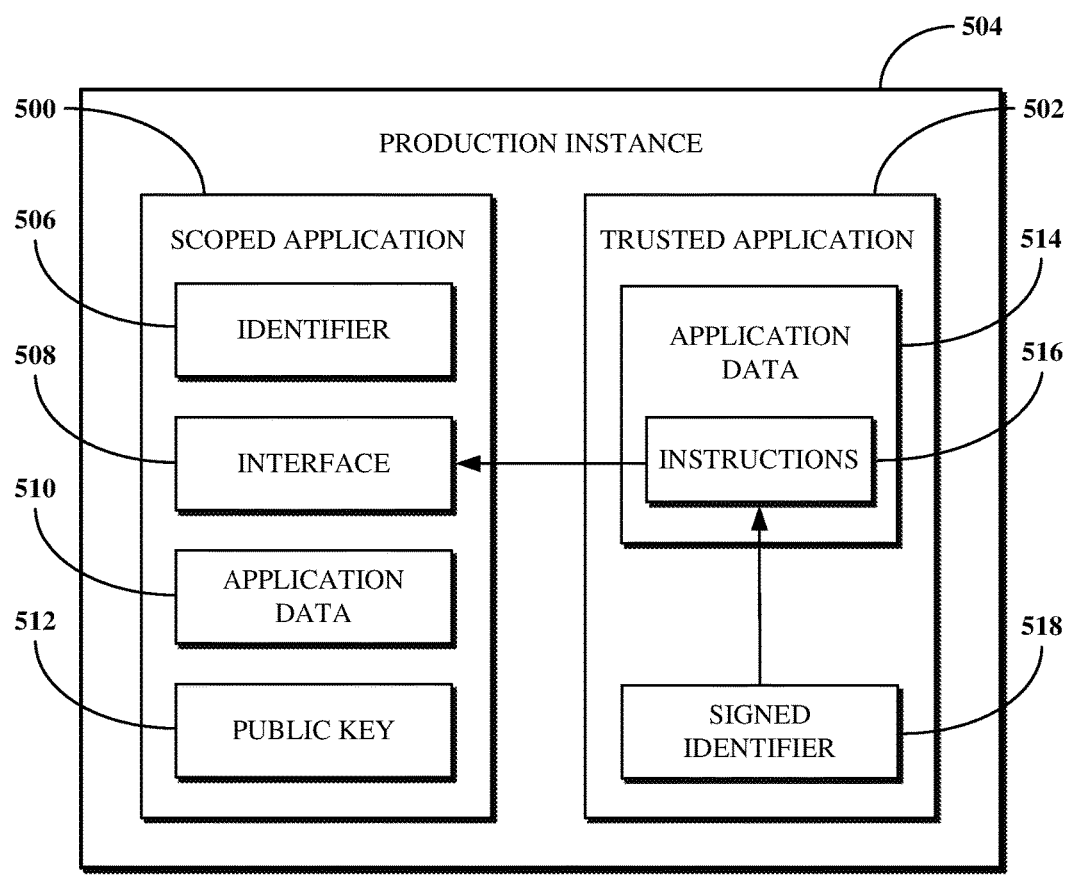
FIG. 5 is a block diagram of an example of access between applications deployed to a production instance.

FIG. 5 is a block diagram of an example of access between applications 500 and 502 deployed to a production instance 504. The scoped application 500 is a scoped application, and the trusted application 502 is a trusted application. The production instance 504 can be, for example, the production instance 306 shown in FIG. 3 or the production instance 404 shown in FIG. 4. The scoped application 500 can be, for example, the scoped application 400 of the production instance 404 shown in FIG. 4. The trusted application 502 can be, for example, the trusted application 402 of the production instance 404 shown in FIG. 4.

The scoped application 500 includes an identifier 506, an interface 508, application data 510, and a public key 512. The identifier 506 can be, for example, the identifier 410 shown in FIG. 4. The interface 508 can be, for example, the interface 416 shown in FIG. 4. The application data 510 can be, for example, the application data 418 shown in FIG. 4. The public key 512 can be, for example, the public key 420 shown in FIG. 4. The trusted application 502 includes application data 514, which may, for example, be the application data 428 shown in FIG. 4. The application data 514 includes instructions 516. The instructions 516, when executed, can transmit a signed identifier 518 of the trusted application 502 to the interface 508 of the scoped application 500. The signed identifier 518 can be, for example, the signed identifier 422 shown in FIG. 4.

For example, the application data 514 can be application data used to execute functionality of the trusted application 502. Certain functionality of the trusted application 502 can require access to the interface 508 of the scoped application 500 (e.g., in order to access the application data 510 or execute functions of an API of the scoped application 500). The instructions 516 can be instructions generated based on the application data 514 to request access to the interface 508 of the scoped application 500.

The scoped application 500 can receive a request for access to the interface 508 from the trusted application 502. The request received from the trusted application 502 can include the signed identifier 518. Prior to permitting the scoped application 500 permitting the trusted application 502 to have access to the interface 508, the scoped application 500 can authenticate and verify the signed identifier 518. The scoped application 500 can authenticate the signed identifier 518 using the public key 512.

For example, the signed identifier 518 can be associated with a signature. The signature can be a certificate generated using a private key that corresponds to the public key 512. For example, the private key can be maintained at a customer service instance (e.g., the customer service instance 300 shown in FIG. 3). The signing of the signed identifier 518 using the private key can take the form of the signature. The signature can be included in trusted application 502 during development of the trusted application 502. For example, a developer of the trusted application 502 may identify resources of the scoped application 500 that may be needed to execute functionality of the trusted application 502. The developer can transmit a request to a customer service instance for the signature. The trusted application 502 can later be deployed to the production instance 504 with the signature as the signed identifier 518.

The scoped application 500 can authenticate the signed identifier 518 using the public key 512. For example, the scoped application 500 can include functionality to determine whether a signature of the signed identifier 518 was generated using the private key that corresponds to the public key 512. For example, the scoped application 500 can authenticate the signed identifier 518 using the public key 512.

The scoped application 500 can verify that the signed identifier 518 matches an identifier of the trusted application 502. For example, the scoped application 500 can include functionality for comparing a sys_id associated with the signed identifier 518 it received from the trusted application 502 to a sys_id associated with the trusted application 502. For example, the scoped application 500 can request a sys_id of the trusted application 502 from the production instance 504 responsive to the access request received from the trusted application 502 (e.g., by executing a function of an API of the production instance 504). The scoped application 500 can compare that sys_id to a sys_id included in the signed identifier 518. The scoped application 500 can verify that the signed identifier 518 matches the identifier of the trusted application 502 when those sys_ids are identical.

The trusted application 502 can be permitted to have access to the interface 508 responsive to the authentication and verification. The resources of the scoped application 500 that can be accessed by the trusted application 502 via the interface 508 using the signed identifier 518 can be defined by an application scope of the scoped application 500. For example, the application scope of the scoped application 500 may be included within the identifier 506. The application scope of the scoped application 500 indicates one or more database tables, fields, script names, API calls, or the like that are available to the scoped application 500. As such, responsive to the authentication and verification of the signed identifier 518, the trusted application 502 can be permitted to have access to those resources indicated by the application scope of the scoped application 500.

Implementations of the access between the applications 500 and 502 depicted in FIG. 5 can include additional, less, or combined functionality as compared to that described above, or functionality other than that described above, or combinations thereof. In some implementations, the interface 508 of the scoped application 500 can directly access the signed identifier 518 of the trusted application 502. For example, the application data 514 may omit the instructions 516. Instead, the scoped application 500, via the interface 508, can retrieve the signed identifier 518, such as responsive to a request from the trusted application 502 to access the interface 508 and/or the application data 510 of the scoped application 500. For example, a specified store may be used for the signed identifier 518. The interface 508 may access that specified store to retrieve the signed identifier 518.

In some implementations, the trusted application 502 may include an interface (not shown). The interface of the trusted application 502 can have functionality similar to the interface 508 of the scoped application 500. For example, the trusted application 502 may receive a request from another trusted application (not shown). Responsive to authenticating and validating a signed identifier of that other trusted application, that other trusted application may be permitted to have access to the interface of the trusted application 502. The trusted application 502 may thus also have a public key (not shown) for authenticating the signed identifier of that other trusted application prior to permitting the access to the interface of the trusted application 502.

In some implementations, a secondary key pair including a secondary public key and a secondary private key can be generated to encrypt data exchanged between the scoped application 500 and the trusted application 502. For example, the scoped application 500 can include the secondary private key, and the trusted application 502 can include the secondary public key. The instructions 516 or a different request of the trusted application 502 can be encrypted by the trusted application 502 using the secondary public key. The encrypted instructions or request is transmitted to the scoped application 500, which can decrypt the encrypted instructions or request using the secondary private key. This may introduce additional security for protecting exchanges of data between the scoped application 500 and the trusted application 502.

In some implementations, the scoped application 500 can include functionality for denying access to the interface 508 by a non-trusted application. For example, the non-trusted application can be another application deployed to the production instance 504. The non-trusted application can execute instructions for transmitting a request for access to the scoped application 500. However, the scoped application 500 can deny the request upon determining that the non-trusted application is not a trusted application. For example, the request received from the non-trusted application can be denied responsive to a determination that an identifier of the non-trusted application is not signed using a private key that corresponds to the public key embedded in the scoped application. In another example, the request received from the non-trusted application can be denied responsive to a determination that a signed identifier received from the non-trusted application cannot be authenticated using the public key of the scoped application. In yet another example, the request received from the non-trusted application can be denied responsive to a determination that the signed identifier received from the non-trusted application does not match an identifier of the non-trusted application.

Figure 6:
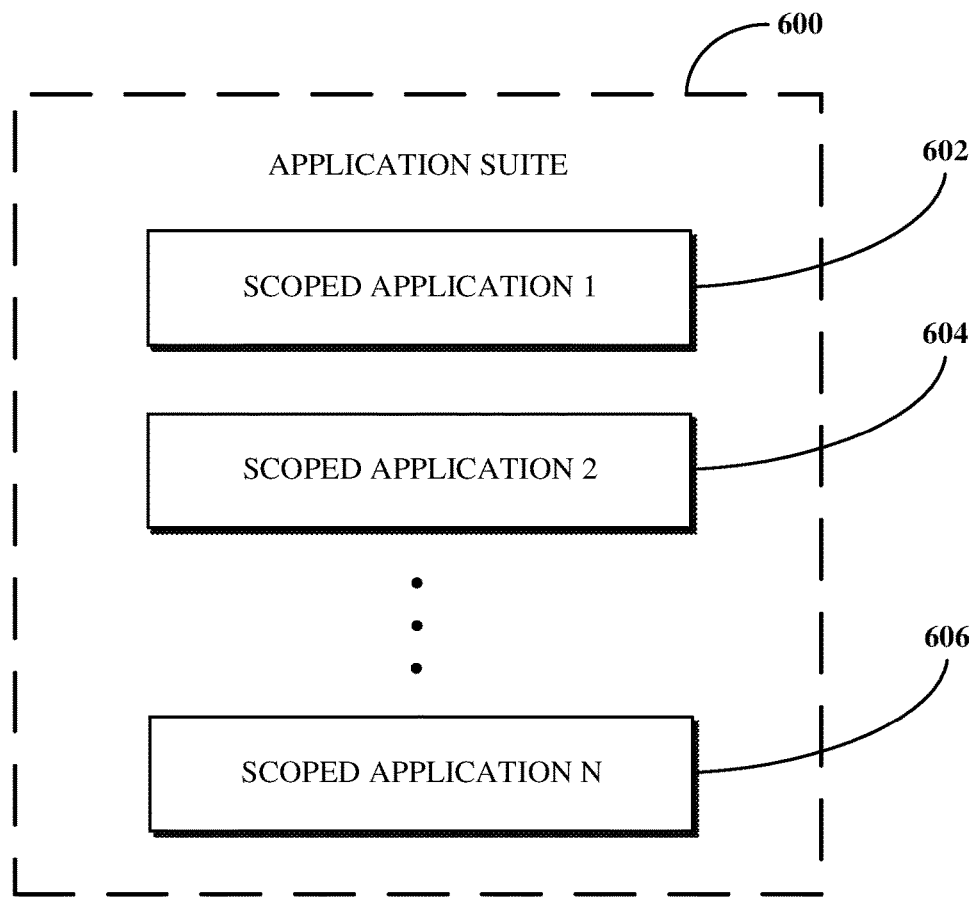
FIG. 6 is a block diagram of an example application suite.

FIG. 6 is a block diagram of an example application suite 600. The application suite 600 includes a number of scoped applications 602, 604, and 606 that may have related functionality. The scoped applications 602, 604, and 606 of the application suite 600 may deliver a software service (e.g., to users of a customer of a computing provider) by accessing application data and executing functions of APIs of one another.

For example, the application suite 600 can be a human resources service management service catalog. The scoped applications 602, 604, and 606 can be scoped applications included within the human resources service management service catalog. For example, the scoped application 602 can be a human resources service management portal used for accessing human resources service management tools of the service catalog. The scoped application 604 can be account management software used by human resources service management tools of the service catalog. The scoped application 606 can be on-boarding software used by human resources service management tools of the service catalog.

When the scoped applications 602, 604, and 606 are deployed to a production instance, one of those scoped applications can be a trusted application that requests access to the application data or API of another of the scoped applications. The scoped application that receives the request from the trusted application can include functionality for determining whether the trusted application uses a namespace also used by the scoped application. That scoped application may further include functionality for, upon determining a common namespace between the scoped application and the trusted application, determining whether the trusted application is included within the same application suite as the scoped application. Alternatively, one or both of those determinations can be made using applications other than the scoped application, for example, an instance of platform software used to develop the scoped application.

For example, the application scope of each of the scoped applications 602, 604, and 606 of the application suite 600 can include common elements. The application scope of each of the scoped applications 602, 604, and 606 can have the same prefix, which may, for example, be "customer123_hrsmsc." The term "customer123" as used therein can be an element associated with a customer of a computing provider that developed or otherwise provides the scoped applications 602, 604, and 606. The term "hrsmsc" as used therein can be an element associated with a name of the application suite (e.g., human resources service management service catalog).

The common elements of the application scopes of the scoped applications 602, 604, and 606 can be used to permit access between the scoped applications 602, 604, and 606 of the application suite 600 using a signed identifier of one of the scoped applications 602, 604, and 606. For example, the scoped application 602 may be a signed identifier that permits the scoped application 602 to access resources of the scoped application 604. The scoped applications 604 and 606 may have application scopes that include common elements, for example, an element associated with the name of the application suite 600. The scoped application 602 may request access to resources of the scoped application 606. The scoped application 606 can verify that the signed identifier of the scoped application 602 matches an identifier known to an instance to which the scoped applications 602 and 606 are deployed. Responsive to the verification, the scoped application 606 can match an element of the application scope of the scoped application 602 to an element of the application scope of the scoped application 606 (e.g., the common element for the name of the application suite 600). Responsive to that matching, the scoped application 606 can authenticate the scoped application 602 using the same signed identifier that permits access by the scoped application 602 to the scoped application 604.

In another example, the scoped applications 602, 604, and 606 of the application suite 600 can be permitted to have access to the resources of each other where those applications are developed by the same developer (e.g., a customer of a computing provider). The scoped application 602 can be permitted to access the scoped application 606 by matching an element of an application scope of the scoped application 602 against a root shared by the application scope of the scoped application 606. For example, it can be determined that the prefix of the application scopes of each of the scoped application 602 and the scoped application 606 begin with the same element that is associated with a developer. The scoped application 602 can be permitted to have access to the resources of the scoped application 606 responsive to that determination.

Figure 7:
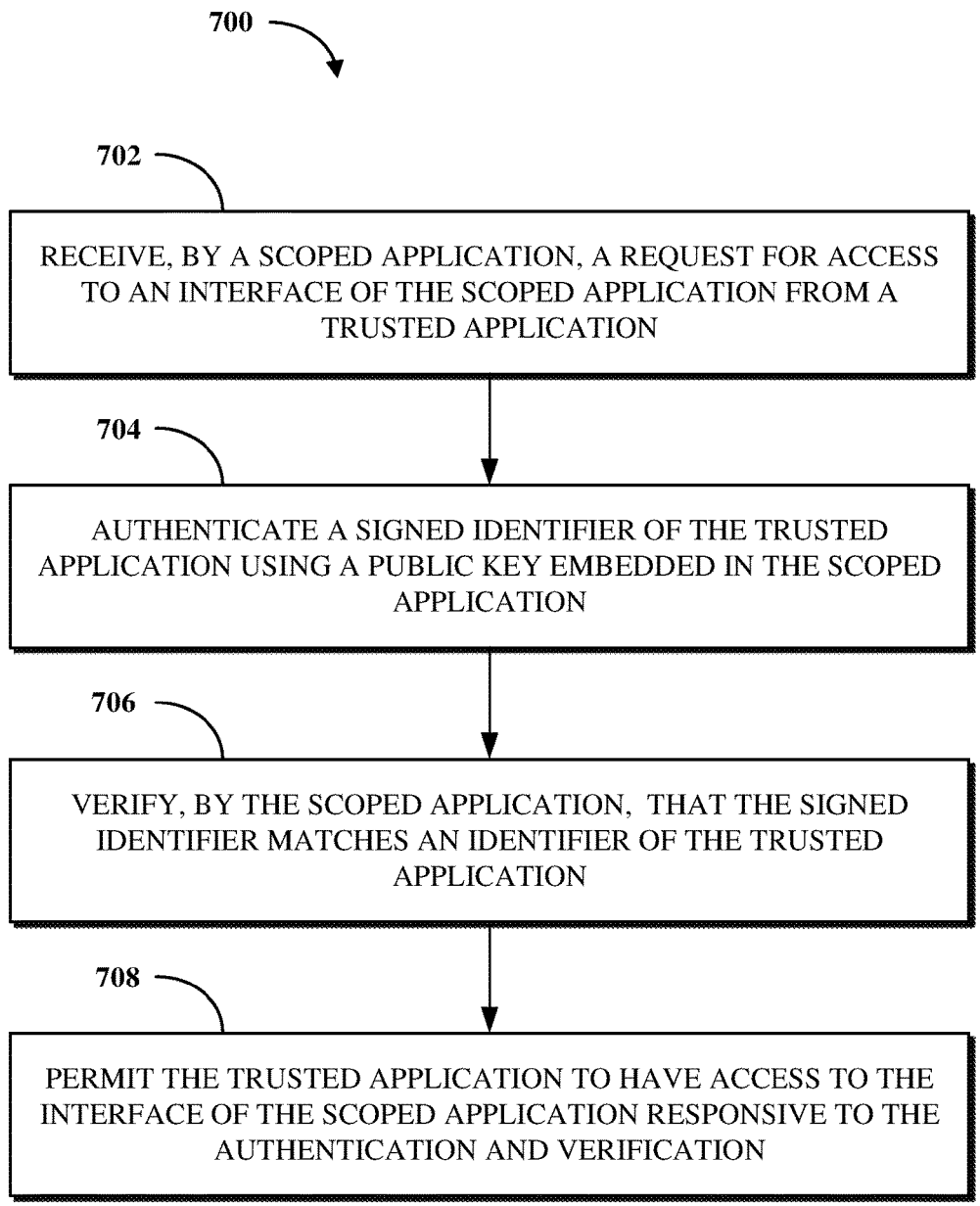
FIG. 7 is a flowchart illustrating an example of a technique for permitting access to a scoped application by a trusted application.

FIG. 7 is a flowchart illustrating an example of a technique 700 for permitting access to a scoped application by a trusted application using a public key. The technique 700 can be executed using computing devices, such as the systems, modules, and devices described with respect to FIGS. 1-6. The technique 700 can be performed, for example, by executing a machine-readable program or other computer-executable instructions, such as instructions or programs described according to JavaScript, C, or other such instructions. The steps, or operations, of the technique 700 or any other technique, method, process, or algorithm described in connection with the implementations disclosed herein can be implemented directly in hardware, firmware, software executed by hardware, circuitry, or a combination thereof.

In an implementation, the technique 700 includes receiving a request for access to an interface of a scoped application from a trusted application via 702, authenticating a signed identifier of the trusted application using a public key embedded in the scoped application via 704, verifying that the signed identifier matches an identifier of the trusted application via 706, and permitting the trusted application to have access to the interface of the scoped application responsive to the authentication and verification via 708.

At 702, a request for access to an interface of a scoped application is received by the scoped application from a trusted application. The request received from the trusted application can include a signed identifier. The signed identifier can be signed using a private key. The private key can correspond to a public key embedded in the scoped application. The private key and public key can comprise a key pair, such as may be generated at a customer service instance, which maintains the private key. For example, a signature (e.g., a certificate generated using the private key) can be included in the trusted application at a development instance, for example, responsive to a request for the signature from the customer service instance. The customer service instance can transmit the signature to the development instance for the trusted application responsive to the request.

At 704, the signed identifier of the trusted application is authenticated by the scoped application. The scoped application can authenticate the signed identifier of the trusted application using the public key embedded in the scoped application. For example, the scoped application can include functionality to determine whether a certificate of the signed identifier was generated using the private key that corresponds to the public key. For example, the scoped application can authenticate the certificate received from the trusted application at 702 using the public key to make that determination. If the certificate cannot be authenticated using the public key, the scoped application can determine that the signed identifier was not signed using the private key that corresponds to the public key.

At 706, the scoped application verifies that the signed identifier of the trusted application matches an identifier of the trusted application. For example, the scoped application can request a sys_id of the trusted application from functionality of an instance to which the scoped application and the trusted application are deployed. The scoped application can compare that sys_id to a sys_id included in the signed identifier, which the scoped application received at 702. In addition, or alternatively, an application scope associated with the scoped application can be received from the instance and compared with an application scope included in the signed identifier. The scoped application can verify that the signed identifier matches the identifier of the trusted application when those sys_ids are identical. At 708, the trusted application can be permitted to have access to the interface responsive to the authentication performed at 704 and the verification performed at 706.

Although the technique 700 is shown as a series of operations for clarity, implementations of the technique 700 or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

In some implementations, the authentication at 704 can be performed before the verification at 706. In some implementations, the authentication at 704 can be performed after the verification at 706. In some implementations, the authentication at 704 and the verification at 706 can be simultaneously performed. In some implementations, the technique 700 can include removing or updating the public key from the scoped application to prevent access to the interface of the scoped application by the trusted application. For example, an application scope of the scoped application can be changed after the scoped application is developed, such as to restrict the accessibility of the application data and/or API of the scoped application by other scoped applications.

In some implementations, the signed identifier may be encrypted instead of being signed. For example, the signed identifier may be encrypted using the private key and may be decrypted using the public key embedded in the scoped application to permit the scoped application to access the sys_id and/or application scope included in the signed identifier. In such implementations, the signed identifier is authenticated if it can be decrypted using the public key.

In some implementations, the technique 700 can include denying access to the interface of the scoped application by a non-trusted application. For example, the non-trusted application can be denied from accessing the interface of the scoped application responsive to a determination that an identifier of the non-trusted application is not signed using a private key that corresponds to the public key embedded in the scoped application. In another example, the non-trusted application can be denied from accessing the interface of the scoped application responsive to a determination that a signed identifier received from the non-trusted application cannot be authenticated using the public key of the scoped application. In yet another example, the non-trusted application can be denied from accessing the interface of the scoped application responsive to a determination that the signed identifier received from the non-trusted application does not match an identifier of the non-trusted application.

An implementation includes means for receiving, by the scoped application, a request for access to an interface of the scoped application from the trusted application, the request including a signed identifier that is signed using a private key corresponding to the public key; means for authenticating the signed identifier using the public key; means for verifying, by the scoped application, that the signed identifier matches an identifier of the trusted application; and means for permitting the trusted application to have access to the interface of the scoped application responsive to authenticating the signed identifier and verifying that the signed identifier matches the identifier of the trusted application.

An implementation includes means for deploying a scoped application including a public key to a production instance; and means for deploying a trusted application including a signed identifier to the production instance, wherein a certificate associated with the signed identifier is signed using a private key corresponding to the public key, wherein the public key authenticates the certificate to permit the trusted application to have access to an interface of the scoped application.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for permitting access to a first scoped application by a second scoped application using a public key, the system comprising:
    a memory; and
    a processor,
    wherein the memory includes instructions executable by the processor to:
        receive, by the first scoped application, a request for access to an interface of the first scoped application from the second scoped application, wherein a first set of application data is only accessible by the first scoped application at time of the request, wherein a second set of application data is only accessible by the second scoped application at the time of the request, the request comprising a signed identifier that is signed using a private key corresponding to the public key, wherein the first scoped application is deployed to a production instance and wherein the public key is embedded in the first scoped application prior to deployment of the first scoped application to the production instance;
        authenticate the signed identifier using the public key;
        verify, by the first scoped application, that the signed identifier matches a trusted identifier of the second scoped application; and
        permit the second scoped application to have access to a subset of the first set of application data via the interface of the first scoped application responsive to the authentication of the signed identifier and the verification that the signed identifier matches the trusted identifier of the second scoped application.

2. The system of claim 1, wherein the instructions to authenticate the signed identifier using the public key include instructions executable by the processor to:
    determine that a signed certificate associated with the signed identifier is generated using the private key by authenticating the signed certificate using the public key.

3. The system of claim 1, wherein the instructions to verify that the signed identifier matches the trusted identifier of the second scoped application include instructions executable by the processor to:
    receive the trusted identifier of the second scoped application from an instance at which the first scoped application and the second scoped application are deployed, the trusted identifier of the second scoped application including a first sys_id;
    compare the first sys_id to a second sys_id associated with the signed identifier to determine that the first sys_id and the second sys_id are identical; and
    determine that the signed identifier matches the trusted identifier of the second scoped application responsive to the comparison.

4. The system of claim 1, wherein the request is a first request, wherein the second scoped application transmits a second request to a customer service instance for the signed identifier used to access the interface of the first scoped application, wherein the trusted identifier of the second scoped application is signed at the customer service instance using the private key at the customer service instance to generate the signed identifier responsive to the second request.

5. The system of claim 1, wherein the public key is embedded in the first scoped application at a non-production instance associated with the first scoped application, wherein the non-production instance comprises a development instance.

6. The system of claim 1, wherein the memory further includes instructions executable by the processor to:
    deny access to the interface of the first scoped application by a non-trusted application responsive to one or more of a first determination that a non-trusted identifier of the non-trusted application is not signed using the private key, a second determination that the signed identifier received from the non-trusted application cannot be authenticated using the public key of the first scoped application, or a third determination that the signed identifier received from the non-trusted application does not match the non-trusted identifier of the non-trusted application.

7. The system of claim 1, wherein the memory further includes instructions executable by the processor to:
    remove the public key from the first scoped application to prevent access to the interface of the first scoped application by the second scoped application.

8. The system of claim 1, wherein the first scoped application includes an application scope that indicates application data of the first scoped application that is accessible by the second scoped application, wherein the second scoped application is permitted to access the application data of the first scoped application using the interface of the first scoped application responsive to the authentication of the signed identifier and the verification that the signed identifier matches the trusted identifier of the second scoped application.

9. A method for permitting access to a first scoped application by a second scoped application using a public key, the method comprising:
- receiving, by the first scoped application, a request for access to an interface of the first scoped application from the second scoped application, wherein a first set of application data is only accessible by the first scoped application at time of the request, wherein a second set of application data is only accessible by the second scoped application at the time of the request, the request comprising a signed identifier that is signed using a private key corresponding to the public key, wherein the first scoped application is deployed to a production instance and wherein the public key is embedded in the first scoped application prior to deployment of the first scoped application to the production instance;
- authenticating the signed identifier using the public key;
- verifying, by the first scoped application, that the signed identifier matches a trusted identifier of the second scoped application; and
- permitting the second scoped application to have access to a subset of the first set of application data via the interface of the first scoped application responsive to authenticating the signed identifier and verifying that the signed identifier matches the trusted identifier of the second scoped application.

10. The method of claim 9, wherein authenticating the signed identifier using the public key comprises:
- determining that a signed certificate associated with the signed identifier is generated using the private key by authenticating the signed certificate using the public key.

11. The method of claim 9, wherein verifying that the signed identifier matches the trusted identifier of the second scoped application comprises:
- receiving the trusted identifier of the second scoped application from an instance at which the first scoped application and the second scoped application are deployed, the trusted identifier of the second scoped application including a first sys_id;
- comparing the first sys_id to a second sys_id associated with the signed identifier to determine that the first sys_id and the second sys_id are identical; and
- determining that the signed identifier matches the trusted identifier of the second scoped application responsive to the comparing.

12. The method of claim 9, wherein the request is a first request, wherein the second scoped application transmits a second request to a customer service instance for the signed identifier used to access the interface of the first scoped application, wherein the trusted identifier of the second scoped application is signed at the customer service instance using the private key at the customer service instance to generate the signed identifier responsive to the second request.

13. The method of claim 9, wherein the public key is embedded in the first scoped application at a non-production instance associated with the first scoped application, wherein the non-production instance comprises a development instance.

14. The method of claim 9, the method further comprising:
- denying access to the interface of the first scoped application by a non-trusted application responsive to one or more of a first determination that a non-trusted identifier of the non-trusted application is not signed using the private key, a second determination that the signed identifier received from the non-trusted application cannot be authenticated using the public key of the first scoped application, or a third determination that the signed identifier received from the non-trusted application does not match the non-trusted identifier of the non-trusted application.

15. The method of claim 9, the method further comprising:
- removing the public key from the first scoped application to prevent access to the interface of the first scoped application by the second scoped application.

16. The method of claim 9, wherein the first scoped application includes an application scope that indicates application data of the first scoped application that is accessible by the second scoped application, wherein the second scoped application is permitted to access the application data of the first scoped application using the interface of the first scoped application responsive to the authentication of the signed identifier and the verification that the signed identifier matches the trusted identifier of the second scoped application.

17. A non-transitory computer-readable storage medium, comprising processor-executable routines that, when executed by a processor, facilitate a performance of operations comprising:
- deploying a first scoped application to a production instance, wherein the first scoped application includes a public key embedded in the first scoped application prior to deployment of the first scoped application to the production instance, wherein a first set of application data is only accessible by the first scoped application at time of deploying the first scoped application; and
- deploying a second scoped application including a signed identifier to the production instance, wherein a certificate associated with the signed identifier is signed using a private key corresponding to the public key, wherein a second set of application data is only accessible by the second scoped application at time of deploying the second scoped application,
- wherein the public key authenticates the certificate to permit the second scoped application to have access to a subset of the first set of application data via an interface of the first scoped application.

18. The non-transitory computer-readable storage medium of claim 17, wherein the first scoped application is received from a first development instance and the second scoped application is received from a second development instance.

19. The non-transitory computer-readable storage medium of claim 18, wherein the first scoped application is deployed to the first development instance from a customer service instance and the second scoped application is deployed to the second development instance from the customer service instance, wherein the customer service instance includes the private key.

20. The non-transitory computer-readable storage medium of claim 19, wherein the certificate is signed by the private key at the customer service instance, wherein the certificate is transmitted from the customer service instance to the second development instance responsive to the signing.

* * * * *